(12) United States Patent
Nomoto (10) Patent No.: US 10,897,053 B2
(45) Date of Patent: Jan. 19, 2021

(54) AGING DEVICE FOR FUEL CELL STACK (71) Applicant: TOYOTA JIDOSHA KABUSHIKI KAISHA, Toyota (JP)

(72) Inventor: Shigemitsu Nomoto, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 109 days.

(21) Appl. No.: 16/238,211

(22) Filed: Jan. 2, 2019

(65) Prior Publication Data

US 2019/0252702 A1  Aug. 15, 2019

(30) Foreign Application Priority Data

Feb. 14, 2018 (JP) .................. 2018-023908

(51) Int. Cl.
    H01M 8/04537 (2016.01)
    H01M 8/04955 (2016.01)
    H01M 8/04302 (2016.01)
    H01M 8/04828 (2016.01)
    H01M 8/04746 (2016.01)
    H01M 8/04858 (2016.01)
    H01M 8/04992 (2016.01)

(52) U.S. Cl.
    CPC ..... *H01M 8/04559* (2013.01); *H01M 8/0494* (2013.01); *H01M 8/04302* (2016.02); *H01M 8/04552* (2013.01); *H01M 8/04753* (2013.01); *H01M 8/04873* (2013.01); *H01M 8/04955* (2013.01); *H01M 8/04992* (2013.01)

(58) Field of Classification Search
    CPC ........... H01M 8/04559; H01M 8/0494; H01M 8/04873; H01M 8/04955; H01M 8/04552; H01M 8/04302
    See application file for complete search history.

(56) References Cited

U.S. PATENT DOCUMENTS

2016/0133969 A1  5/2016  Bono et al.
2017/0338499 A1  11/2017  Murata et al.

FOREIGN PATENT DOCUMENTS

JP  2016-095907 A  5/2016
JP  2017-152138 A  8/2017
JP  2017-208299 A  11/2017

Primary Examiner — Ladan Mohaddes
(74) Attorney, Agent, or Firm — Oliff PLC (57) ABSTRACT Provided is an aging device for a fuel cell stack, capable of reliably detecting the generation of a negative voltage during aging while also achieving a cost reduction with reduced cell monitors. The voltage of an end cell on the reactant gas inlet side, in which the voltage is likely to become the highest, is monitored alone, so that the generation of a negative voltage in each of a plurality of individual central cells other than the end cell is estimated.

6 Claims, 6 Drawing Sheets

In usual inspection of power generation (at high potential)

FIG. 6B

During aging (at low potential)

AGING DEVICE FOR FUEL CELL STACK

CROSS REFERENCE TO RELATED APPLICATIONS

The present application claims priority from Japanese patent application JP 2018-023908 filed on Feb. 14, 2018, the content of which is hereby incorporated by reference into this application.

BACKGROUND

Technical Field

The present disclosure relates to an aging device for a fuel cell stack having a plurality of stacked cells.

Background Art

A fuel cell stack is a system that obtains electric energy (i.e., an electromotive force) when a fuel gas (e.g., hydrogen) and an oxidant gas (e.g., air) that are reactant gases are supplied to an anode electrode and a cathode electrode, respectively, and thus an electrochemical reaction occurs therebetween.

For example, a polymer electrolyte fuel cell (also referred to as a fuel cell or a unit cell) includes a membrane electrode assembly (MEA) having an ion-conducting electrolyte membrane, and an anode catalyst layer and a cathode catalyst layer (i.e., electrode layers) sandwiching the electrolyte membrane therebetween. Gas diffusion layers (GDLs) for providing a fuel gas or an oxidant gas and collecting power generated through an electrochemical reaction are formed on the opposite sides of the MEA. The MEA having the GDLs on the opposite sides thereof is referred to as a MEGA (Membrane Electrode & Gas Diffusion Layer Assembly), and the MEGA is sandwiched between a pair of separators. Herein, the MEGA is the power-generating portion of the fuel cell. When the gas diffusion layers are not provided, the MEA is the power-generating portion of the fuel cell.

Fuel cells (also referred to as a fuel cell stack) are formed by stacking a plurality of cells with the aforementioned configuration, and are used by being mounted on a vehicle, such as an automobile, for example.

Such type of fuel cell stack has low initial power generation performance because its catalyst is poisoned with a volatile organic substance generated during the production process. Therefore, in order to elicit the desired power generation performance of the fuel cell stack after it is assembled (for example, before the final inspection of the unit power generation in the production process), a preliminary operation (i.e., break-in), which is also referred to as an aging operation (also simply referred to as "aging") is performed on the fuel cell stack. This aging operation is intended to cause the fuel cell stack to generate power preliminarily after it is assembled so that the desired cell performance can be attained. Further, not only after the fuel cell stack is produced, but also before the fuel cell stack is caused to generate power again (before the operation of the fuel cell stack is started again) after its operation has been stopped (in particular, stopped for a long time) or when the output characteristics, such as an electromotive force, have decreased due to long-term power generation, for example, there may be cases where the output characteristics of the fuel cell stack can be recovered if the aging operation is performed thereon.

However, a time (i.e., aging time) required to perform the aforementioned aging (i.e., break-in) of the fuel cell stack is quite long, which is thus becoming a significant problem in the production process with an increase in the number of lots and with a spread of such fuel cell stack. Herein, in order to perform such aging of the fuel cell stack at a high speed, it would be essential to perform low-potential power generation (for example, see JP 2017-208299 A), and stop the power generation (i.e., the aging power generation) immediately upon detecting a drop of the voltage of a cell being aged (i.e., cell voltage) as a result of hydrogen having become deficient or dried up, so as to prevent damages to the fuel cell stack.

Meanwhile, as a method for monitoring the voltage of a cell that is generating power, there has conventionally been known a method for monitoring the voltage values of all of the cells through cell monitors that are directly connected to the cells (also referred to as cell monitor connectors). Conventionally, cell monitoring has been performed with a configuration of 1 cell/1 ch (that is, one channel is connected to each cell so that the voltage of each cell is measured through each channel). However, in order to reduce cost, it would be necessary to reduce the number of channels. Thus, it has been proposed to change the configuration to a configuration of a plurality of (for example, 2) cells/1 ch (that is, a plurality of cells is collectively connected to one channel so that the voltage of the plurality of cells is measured through each channel) except at the opposite ends of the stack where a negative voltage (also referred to as a voltage drop) is highly likely to be generated (for example, see JP 2016-095907 A and JP 2017-152138 A).

SUMMARY

When the configuration of 1 cell/1 ch is used, the voltage of each cell can be monitored reliably. Therefore, when hydrogen has become deficient or dried up during power generation as described above, it is possible to stop the power generation before the cell voltage becomes negative (for example, less than or equal to −0.3 V).

However, when the configuration of a plurality of (for example, 2) cells/1 ch is used, it follows that the total voltage of the plurality of cells (for example, the total voltage of two cells if the configuration of 2 cells/1 ch is used) is monitored, and thus, the detection sensitivity would decrease if the voltage of only one cell has become negative. If the power generation is continued even after the voltage has become negative, the deterioration of the catalyst due to the oxidation of carbon would progress, or the generation of heat in the cell would be accelerated, which in turn can damage the entire fuel cell stack. In such a case, if the measurement of resistance, impedance, heat generation, the flow rate of a cathode gas (i.e., an oxidant gas), and/or the like are/is added or used in combination with the cell voltage detection, it would be possible to avoid a decrease in the detection sensitivity of a negative voltage. However, another problem would arise that cost is increased (see JP 2016-095907 A and JP 2017-152138 A above).

Figure 6A:
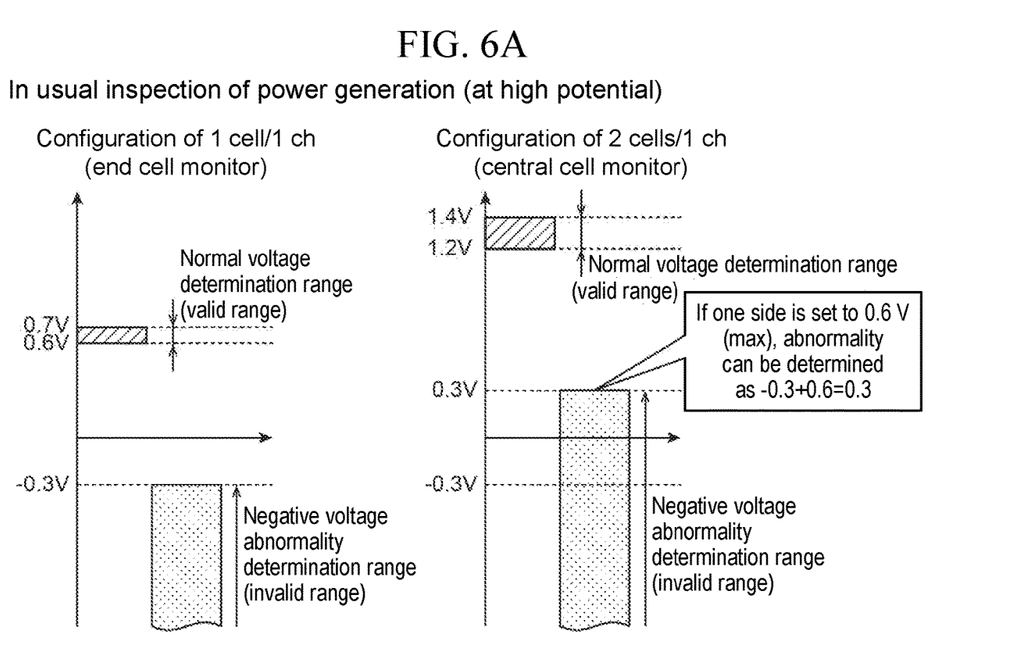
FIG. 6A is a view illustrating a case where the usual inspection of power generation (at a high potential) is performed.

Herein, in the usual inspection of power generation, the cells are maintained at high potentials (around 0.6 to 0.7 V, for example) as sufficient reactant gases are supplied thereto, and in the usual drive of the vehicle, the cells are also at a high voltage. Therefore, a threshold for determining a negative voltage abnormality can be easily set (see FIG. 6A), and thus, the generation of a negative voltage can be detected accurately to a certain extent from a voltage value acquired from a cell monitor that collectively monitors the voltage of a plurality of cells as in the aforementioned configuration of a plurality of cells/1 ch.

Figure 6B:
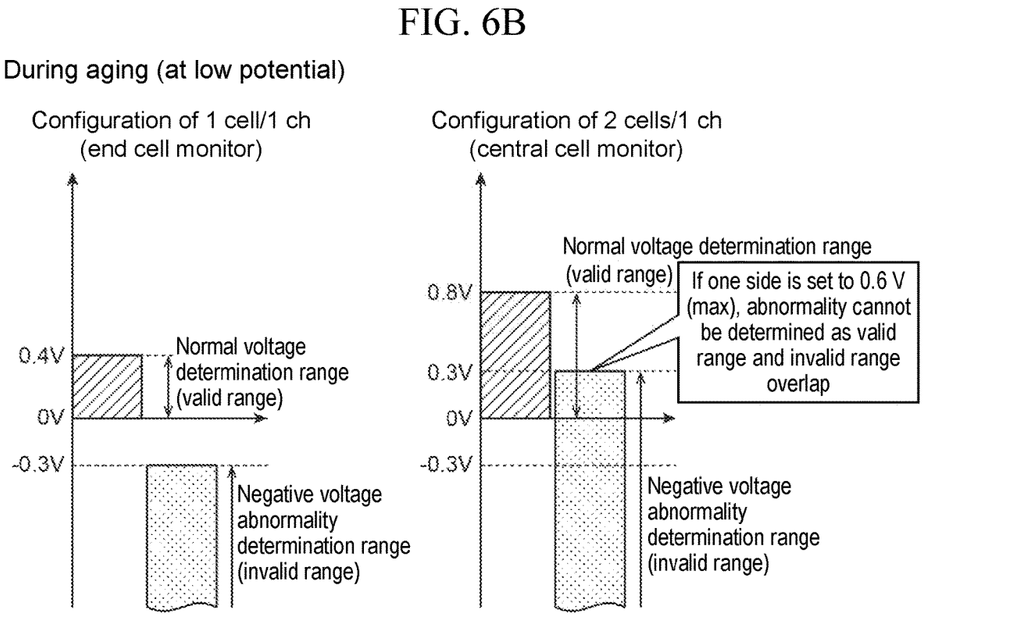
FIG. 6B is a view illustrating a case where aging (at a low potential) is performed.

However, when low-potential (0 to 0.4 V, for example) power generation for aging is performed, the fluctuation of the voltage is small. Therefore, it would be difficult to set a threshold for determining a negative voltage abnormality (see FIG. 6B), and thus, the generation of a negative voltage is difficult to detect accurately.

The present disclosure has been made in view of the foregoing, and provides an aging device for a fuel cell stack, capable of reliably detecting the generation of a negative voltage during aging while achieving a cost reduction with a reduced number of cell monitors.

Accordingly, an aging device for a fuel cell stack in accordance with the present disclosure is an aging device for a fuel cell stack having a plurality of stacked cells, including: a first cell monitor configured to monitor alone the voltage of a predetermined cell on the reactant gas inlet side; a second cell monitor configured to collectively monitor the voltage of a plurality of cells other than the predetermined cell; and a controller configured to set a voltage value acquired by the first cell monitor as the upper limit voltage value, and estimate the generation of a negative voltage in the plurality of individual cells monitored by the second cell monitor from the voltage values acquired by the first cell monitor and the second cell monitor.

The controller may be configured to set each value so that an abnormal voltage threshold determined by $\beta+\alpha 2\times(n-1)$ becomes less than $\alpha 1\times n$, where $\alpha 1$ and $\alpha 2$ indicate the upper limit and the lower limit, respectively, of the normal voltage determination range for a cell during aging, $\beta$ indicates the upper limit of the range of determination of a negative voltage abnormality, and n indicates the number of cells monitored by the second cell monitor, and compare the upper limit voltage value with the $\alpha 1$, thereby controlling the power generation state of the fuel cell stack during aging.

The controller may be configured to, when the upper limit voltage value exceeds the $\alpha 1$, determine that there is a possibility of a negative voltage generated in the plurality of cells monitored by the second cell monitor, and thus stop aging power generation.

The $\alpha 1$ may be set to greater than or equal to the lower limit of the target voltage range of the aging, and the $\alpha 2$ may be set to less than the upper limit of the target voltage range of the aging.

The controller may be configured to set a control switch determination threshold that is less than the $\alpha 2$, and when the upper limit voltage value exceeds the control switch determination threshold, increase the amount of current to be supplied to the fuel cell stack, increase the amount of an inert gas to be mixed in a reactant gas, or reduce the amount of an oxidant gas to be supplied as a reactant gas, thereby controlling the voltage of each cell such that the voltage becomes lower.

The aging device may further include a third cell monitor configured to monitor alone the voltage of a cell at a position farthest from the reactant gas inlet side. The controller may be configured to set a voltage value acquired by the third cell monitor as another upper limit voltage value, and when the other upper limit voltage value exceeds the $\alpha 1$, determine that there is a possibility of a negative voltage generated in the plurality of cells monitored by the second cell monitor, thereby stopping aging power generation.

According to the present disclosure, the voltage of a cell on the reactant gas inlet side, in which the voltage is likely to become the highest, is monitored alone so that the generation of a negative voltage in the plurality of individual cells other than the cell on the reactant gas inlet side is estimated. Therefore, the generation of a negative voltage during aging can be reliably detected while a cost reduction can also be achieved with reduced cell monitors.

BRIEF DESCRIPTION OF THE DRAWINGS

FIGS. 6A and 6B are views illustrating the normal voltage determination range and the negative voltage abnormality determination range for a cell voltage of an end cell monitor, and the normal voltage determination range and the negative voltage abnormality determination range for a cell voltage of a central cell monitor of the conventional technology; specifically.

DETAILED DESCRIPTION

Hereinafter, the configuration of the present disclosure will be described in detail with reference to exemplary embodiments illustrated in the drawings. Hereinafter, a case where the present disclosure is applied to a fuel cell stack or a fuel cell system including the fuel cell stack mounted on a fuel cell vehicle will be described, but the range of application of the present disclosure is not limited thereto.

[Configuration of Fuel Cells (or Fuel Cell Stack)]

Figure 1:
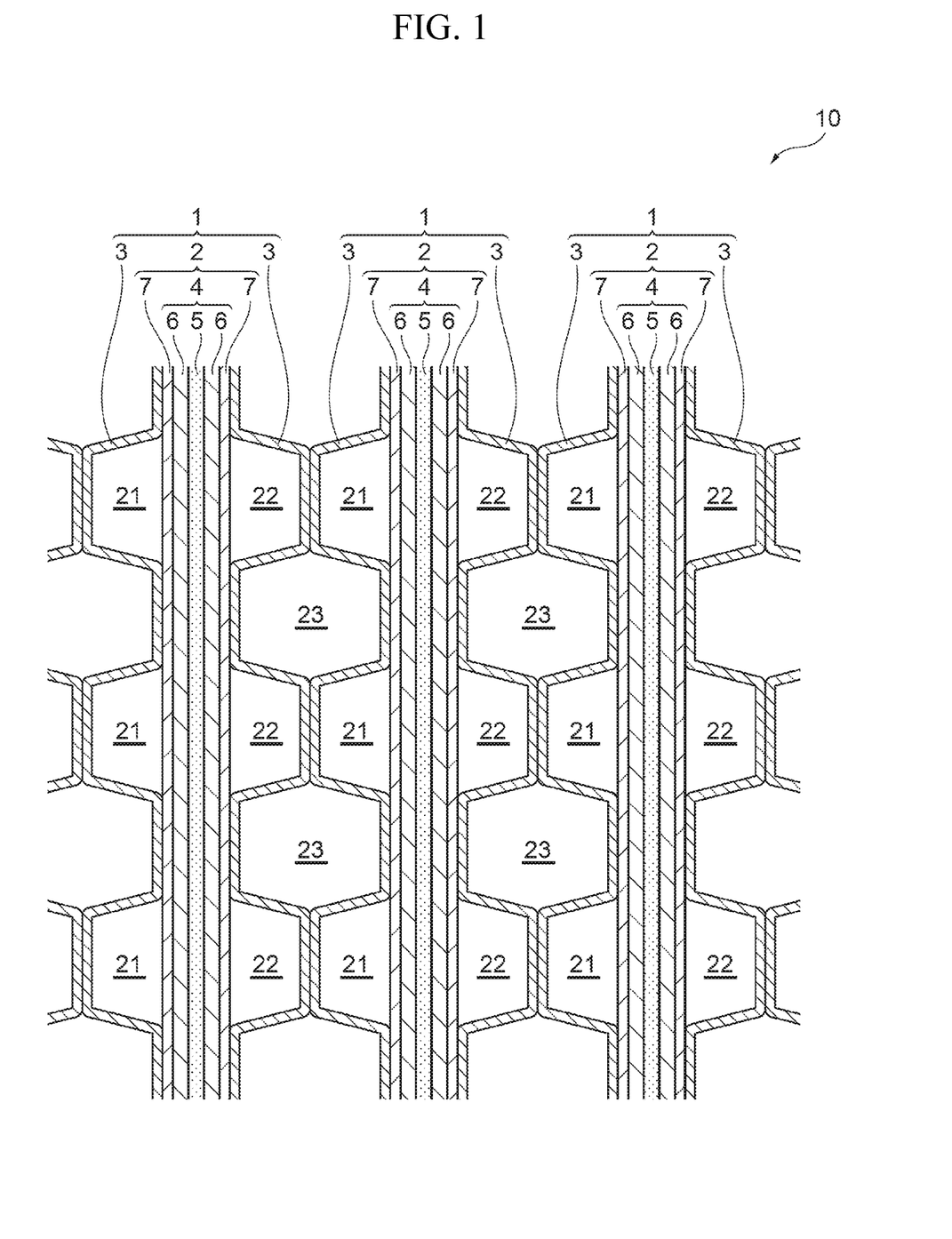
FIG. 1 is a cross-sectional view of the primary portion of exemplary fuel cells (or fuel cell stack) as a target to be applied to an aging device for a fuel cell stack in accordance with the present disclosure.

FIG. 1 is a cross-sectional view of the primary portion of exemplary fuel cells (or fuel cell stack) as a target to be applied to an aging device for a fuel cell stack in accordance with the present disclosure.

As illustrated in FIG. 1, a fuel cell stack (or stacked fuel cells) 10 has a plurality of stacked cells (or unit cells) 1. Each cell 1 is a polymer electrolyte fuel cell that generates an electromotive force through an electrochemical reaction between an oxidant gas (e.g., air) and a fuel gas (e.g., a hydrogen gas). The cell 1 includes a MEGA 2 and separators (i.e., fuel cell separators) 3 adapted to be in contact with the MEGA 2 so as to separate the MEGA 2 from MEGAs 2 of adjacent fuel cells. It should be noted that in this embodiment, the MEGA 2 is sandwiched between a pair of separators 3, 3.

The MEGA 2 is an integral structure of a membrane electrode assembly (MEA) 4 and gas diffusion layers 7, 7 arranged on the opposite sides thereof. The membrane electrode assembly 4 includes an electrolyte membrane 5 and a pair of electrodes 6, 6 that are joined together so as to sandwich the electrolyte membrane 5 therebetween. The electrolyte membrane 5 is a proton-conducting ion exchange membrane formed of a solid polymer material, and each electrode 6 is formed of a porous carbon material having a catalyst, such as platinum, carried thereon, for example. The electrode 6 arranged on one side of the electrolyte membrane 5 serves as an anode, and the electrode 6 on the other side serves as a cathode. Each gas diffusion layer 7 is formed of a gas-permeable conductive member, such as a carbon porous body like carbon paper or carbon cloth, or a metal porous body like a metallic mesh or foam metal, for example.

In this embodiment, the MEGA 2 is the power-generating portion of the fuel cell stack 10, and the separators 3 are in contact with the gas diffusion layers 7 of the MEGA 2. When the gas diffusion layers 7 are not provided, the membrane electrode assembly 4 is the power-generating portion, and in such a case, the separators 3 are in contact with the membrane electrode assembly 4. Therefore, the power-generating portion of the fuel cell stack 10 includes the membrane electrode assembly 4 and is in contact with the separators 3.

Each separator 3 is a plate-like member made of metal with excellent conductivity, gas impermeability, and the like as a base material, and one surface thereof abuts the gas diffusion layer 7 of the MEGA 2 while the other surface thereof abuts one surface of an adjacent separator 3.

In this embodiment, each separator 3 is formed in the shape of waves or the shape of projections and recesses. Specifically, the separator 3 has such a shape that the shapes of the waves form trapezoids with equal legs, the top portion of each wave is flat, and the opposite ends of the top portion are angular with equal angles. That is, the shapes of each separator 3 seen from the front side and the rear side are almost the same. The top portions of the separator 3 are in surface contact with one of the gas diffusion layers 7 of the MEGA 2, and the top portions of another separator 3 are in surface contact with the other gas diffusion layer 7 of the MEGA 2.

Gas flow channels 21 defined between the gas diffusion layer 7 on one electrode (that is, the anode) 6 side and the separator 3 are channels through which a fuel gas circulates, and gas flow channels 22 defined between the gas diffusion layer 7 on the other electrode (that is, the cathode) 6 side and another separator 3 are channels through which an oxidant gas circulates. When a fuel gas is supplied to the gas flow channels 21 on one side and an oxidant gas is supplied to the gas flow channels 22 on the side that are opposite the gas flow channels 21 with the cell 1 sandwiched therebetween, an electrochemical reaction occurs within the cell 1 so that an electromotive force is generated.

Further, two adjacent cells 1 are arranged such that an electrode 6 to serve as an anode and an electrode 6 to serve as a cathode are arranged opposite each other. In addition, top portions on the rear surface side of a separator 3, which is arranged along an electrode 6 to serve as an anode of a given cell 1, and top portions on the rear surface side of a separator 3, which is arranged along an electrode 6 to serve as a cathode of another given cell 1, are in surface contact with each other. Water that is refrigerant for cooling the cells 1 circulates through spaces 23 defined between the separators 3,3 that are in surface contact with each other between the two adjacent cells 1.

In addition, a gasket (not illustrated) that is a seal member for sealing a fuel gas (e.g., hydrogen) or an oxidant gas (e.g., air) and cooling water is held in a compressed manner between the ends of the two adjacent cells 1.

[Configuration of Fuel Cell System]

Figure 2:
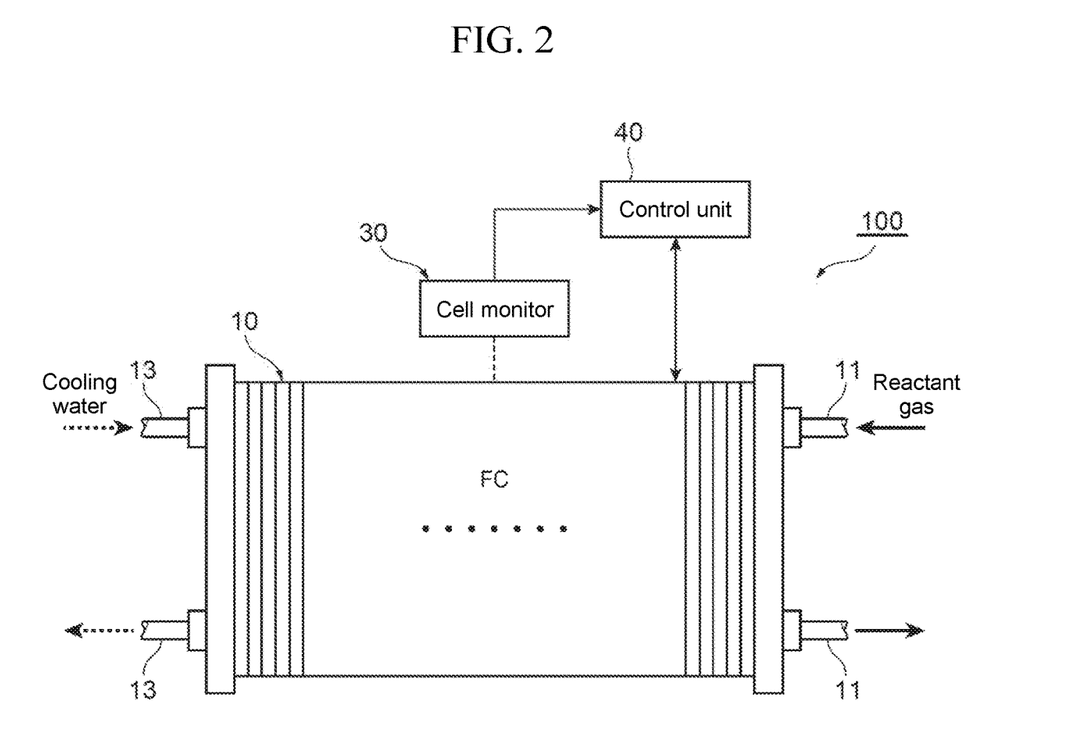
FIG. 2 is a schematic configuration view of a fuel cell system including the fuel cells (or the fuel cell stack) illustrated in FIG. 1.

FIG. 2 is a schematic configuration view of a fuel cell system including the fuel cells (or the fuel cell stack) illustrated in FIG. 1.

As illustrated in FIG. 2, a fuel cell system 100 includes the aforementioned fuel cell stack 10, gas pipes 11 for supplying and discharging reactant gases (i.e., a fuel gas and an oxidant gas) to/from the gas flow channels 21 on the electrode (i.e., anode) 6 side and the gas flow channels 22 on the electrode (i.e., cathode) 6 side; cooling water pipes 13 for supplying and discharging water as refrigerant (i.e., cooling water) to the spaces 23; a cell monitor 30 for inspecting and monitoring the voltage (i.e., cell voltage) of each cell 1; and a control unit (controller) 40 for integrally controlling the entire system.

Figure 3:
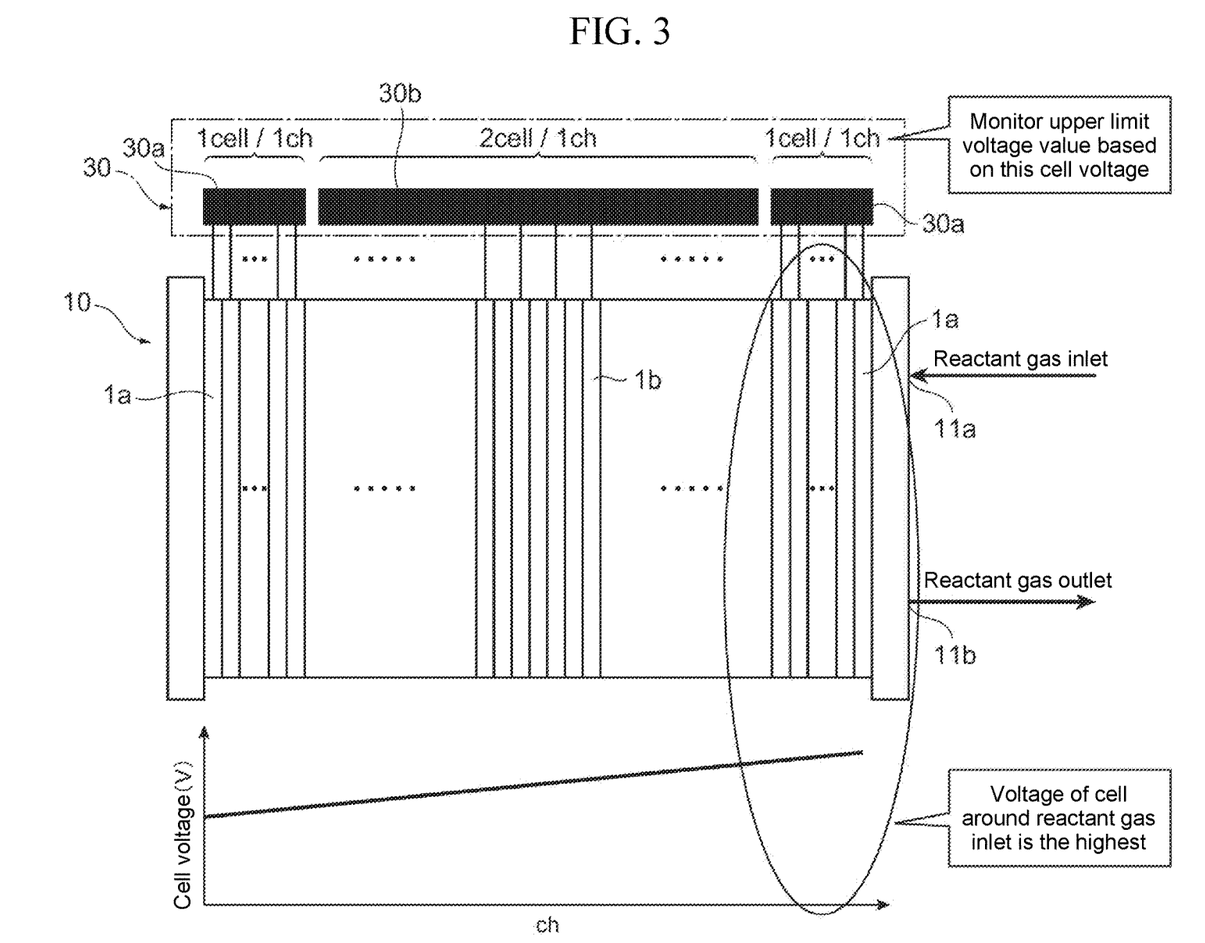
FIG. 3 is a schematic diagram illustrating the connection configuration of a cell monitor illustrated in FIG. 2, and the relationship among a reactant gas inlet, a reactant gas outlet, and a cell voltage.

In this embodiment, the basic unit of monitoring of a cell voltage with the cell monitor 30 is, as illustrated in FIG. 3, "1 cell/1 ch" regarding the cells 1 (for example, one to ten cells 1) located at opposite ends of the fuel cells (or the fuel cell stack) 10 (in the stacked direction of the cells) (hereinafter, such cells shall be referred to as "end cells 1a"); and "a plurality of (2 in the example illustrated in the drawing) cells/1 ch" regarding the cells 1 located in the center of the fuel cells (or the fuel cell stack) 10 (in the stacked direction of the cells) (hereinafter, such cells shall be referred to as "central cells 1b"). That is, in this embodiment, the cell monitor 30 includes end cell monitors 30a, 30a adapted to monitor alone the voltages of the respective end cells 1a, 1a located at opposite ends of the fuel cell stack 10 including the reactant gas inlet 11a side (and the reactant gas outlet 11b side) of the gas pipes 11 and the opposite side thereof that is away from the reactant gas inlet 11a side; and a central cell monitor 30b adapted to collectively monitor the voltage of a plurality of central cells 1b (two central cells 1b in the example illustrated in the drawing) located in the center of the fuel cell stack 10 other than the end cells 1a.

Each end cell monitor 30a (that is, the cell monitor 30 adapted to monitor a cell voltage based on the unit of 1 cell/1 ch) is connected to each cell through one channel and is adapted to measure the voltage of each cell through the channel. Meanwhile, the central cell monitor 30b (that is, the cell monitor 30 adapted to monitor a cell voltage based on the unit of a plurality of cells/1 ch) is connected to a plurality of cells altogether through one channel and is adapted to measure the total sum of the voltage (or the average voltage) of the plurality of cells through the channel.

The voltage values detected by the cell monitor 30 (or the end cell monitor 30a and the central cell monitor 30b thereof) are input to the control unit 40 via a communication line or the like.

Herein, the voltage value of each cell 1 (i.e., cell voltage) detected by the cell monitor 30 (or the end cell monitor 30a or the central cell monitor 30b thereof) is, as illustrated in FIG. 3, higher on the reactant gas inlet 11a side of the gas pipe 11 and becomes lower at a position away from the reactant gas inlet 11a. That is, the voltage value (i.e., cell voltage) of the cell 1 (i.e., the end cell 1a) detected by the end cell monitor 30a on the reactant gas inlet 11a side is likely to become the highest. Thus, the control unit 40 monitors the upper limit voltage value of the fuel cell stack 10 based on the voltage of the end cell 1a on the reactant gas inlet 11a side of the gas pipe 11 (i.e., the voltage detected by the end cell monitor 30a) (which will be described in detail later).

It is acceptable as long as the number of the central cells 1b that are collectively monitored by the central cell monitor 30b (through one channel thereof) is more than one, and is not limited to two as in the example illustrated in FIG. 3. In addition, the number of the central cells 1b that are collectively monitored by the central cell monitor 30b (through one channel thereof) need not be fixed.

The control unit 40 includes a microcomputer that includes a CPU and various memories (e.g., ROM and RAM). The control unit 40 integrally controls the operations of the units that constitute the fuel cell system 100, and acquires information necessary for the integral control, thereby controlling the power generation state (e.g., an output voltage and output current) of the fuel cell stack 10. Specifically, the control unit 40 constantly monitors voltage values and the like detected by the cell monitor 30 (or the end cell monitor 30a and the central cell monitor 30b thereof), thereby controlling the power generation state of the fuel cell stack 10. For example, the control unit 40 is configured to control the power generation state of the fuel cell stack 10 (for example, limits the output or stops the power generation) upon detecting (estimating) a negative voltage generated along with a voltage drop of the cell(s) 1 on the basis of the voltage values from the cell monitor connector 30 (which will be described in detail later).

It should be noted that in this embodiment, the aforementioned cell monitor 30 and control unit 40 constitute the aging device for aging the fuel cell stack 10 described below.

[Aging of Fuel Cells (or Fuel Cell Stack)]

The fuel cell stack 10 with the aforementioned configuration is subjected to aging (break-in) after it is assembled, for example, so that the power generation performance (i.e., output characteristics) thereof is stabilized.

Herein, as described above, when low-potential power generation is performed to increase the aging speed of the fuel cell stack 10, and the voltage of a plurality of cells is collectively monitored, there is a possibility that the entire fuel cells (or the fuel cell stack) 10 may become damaged unless the power generation is stopped immediately upon detecting an abnormality such as deficiency or dry-up of hydrogen. However, in the aforementioned low-potential power generation (for example, around 0 to 0.4 V) performed for aging, it would be difficult to set a threshold for determining a negative voltage abnormality (see FIG. 6B).

Herein, in this embodiment, aging is performed based on the following scheme as a method for reliably detecting a negative voltage abnormality even when a cell voltage is monitored with a configuration of a plurality of (2 in the example illustrated in the drawing) cells/1 ch in the low-potential aging (for example, around 0 to 0.4 V), and thus preventing damages to the fuel cells (or the fuel cell stack) 10.

Herein, in this example, the target voltage range of aging is set to, for example, 0 to 0.4 V to achieve low-potential power generation for completing the aging of the fuel cells (or the fuel cell stack) 10 in a short time.

In addition, the basic unit of monitoring of a cell voltage with the cell monitor 30 (or the end cell monitor 30a or the central cell monitor 30b thereof) is set to 1 cell/1 ch regarding the end cells 1a (i.e., cells that are located at opposite ends of the fuel cell stack 10 (in the stacked direction of the cells) and are monitored by the respective end cell monitors 30a) and is set to 2 cells/1 ch regarding the central cells 1b other than the end cells 1a (i.e., cells that are located in the center of the fuel cell stack 10 (in the stacked direction of the cells) and are monitored by the central cell monitor 30b) (see FIG. 3).

Figure 4:
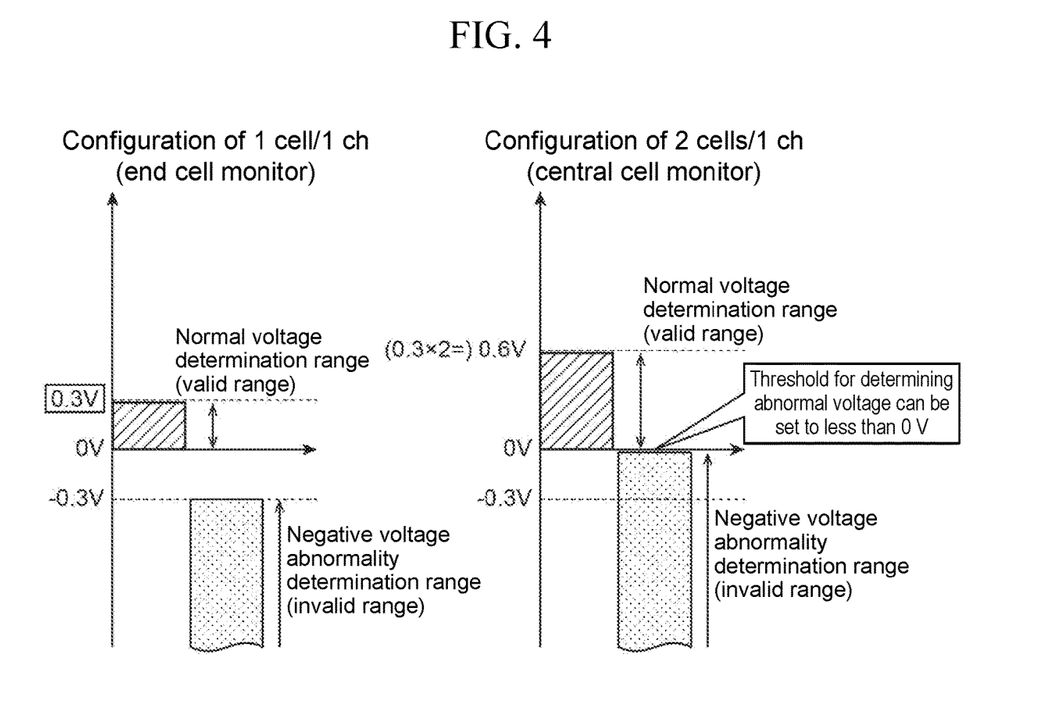
FIG. 4 is a view illustrating examples of the normal voltage determination range and the negative voltage abnormality determination range for a cell voltage of an end cell monitor, and the normal voltage determination range and the negative voltage abnormality determination range for a cell voltage of a central cell monitor during aging (at a low potential)

The voltage threshold for determining a negative voltage abnormality (in other words, the upper limit of the range of determination of a negative voltage abnormality) of the cells 1 (i.e., the end cells 1a and the central cells 1b) is set to −0.3 V (see FIG. 4).

<Setting of Threshold for Determining Negative Voltage Abnormality (i.e., Abnormal Voltage Threshold)>

Provided that the range of the voltage of each cell during aging that can be determined to be normal (hereinafter referred to as a "normal voltage determination range") is $\alpha 1$ to $\alpha 2$ (in other words, the lower limit and the upper limit of the normal voltage determination range are $\alpha 1$ and $\alpha 2$, respectively), the upper limit of the range of determination of a negative voltage abnormality is $\beta$ (−0.3 V in this example), and the number of the central cells 1b monitored by the central cell monitor 30b (through one channel) is n (2 in this example), the threshold for determining a negative voltage abnormality with the central cell monitor 30b (i.e., the abnormal voltage threshold) is represented by the following Formula (1). It should be noted that the normal voltage determination range ($\alpha 1$ to $\alpha 2$) for each cell during aging is set within the target voltage range of aging (0 to 0.4 V in this example), or more specifically, the lower limit $\alpha 1$ of the normal voltage determination range is set to greater than or equal to the lower limit (0 V in this example) of the target voltage range of aging, and the upper limit $\alpha 2$ of the normal voltage determination range is set to less than the upper limit (0.4 V in this example) of the target voltage range of aging.

[Formula 1]

$$\text{Abnormal voltage threshold} = \beta + \alpha 2 \times (n-1) \quad (1)$$

Herein, in the central cell monitor 30b, if the aforementioned abnormal voltage threshold overlaps the normal voltage determination range for the cell during aging (in other words, if the abnormal voltage threshold $\beta + \alpha 2 \times (n-1)$ is greater than or equal to the lower limit $\alpha 1 \times n$ of the normal voltage determination range of the central cell monitor 30b (or the plurality of central cells 1b monitored thereby)), it would be impossible to accurately detect the generation of a negative voltage as described above.

Therefore, the control unit 40 sets the normal voltage determination range ($\alpha 1$ to $\alpha 2$) for each cell during aging so as to satisfy Formula (2) below.

[Formula 2]

$$\beta + \alpha 2 \times (n-1) < \alpha 1 \times n \quad (2)$$

In this example, the lower limit $\alpha 1$ of the normal voltage determination range is set to 0 V that is the lower limit of the target voltage range of aging. Therefore, the control unit 40 sets the upper limit $\alpha 2$ of the normal voltage determination range for each cell during aging to less than 0.3 V, thereby setting the abnormal voltage threshold of the central cell monitor 30b to less than 0 V (=−0.3+0.3×(2−1)) (see FIG. 4).

Accordingly, in the central cell monitor 30b, since the abnormal voltage threshold (less than 0 V in this example) does not overlap the normal voltage determination range for the cell during aging (0 to 0.6 V in this example) (in other words, the abnormal voltage threshold is less than the lower limit of the normal voltage determination range), the generation of a negative voltage can be accurately detected.

<Control of Power Generation State>

The control unit 40 sets each value of the normal voltage determination range (e.g., $\alpha 1$ to $\alpha 2$) and the like as described above, and also sets a control switch determination threshold α3 (0.25 V in this example) that is further lower than the upper limit α2 (less than 0.3 V in this example) of the normal voltage determination range, and constantly monitors whether, of the cells 1 that constitute the fuel cell stack 10, the end cell 1a located near the reactant gas inlet 11a of the gas pipe 11, in which the cell voltage is likely to become the highest, is at a voltage that exceeds the control switch determination threshold α3 (0.25 V in this example) or the upper limit α2 (less than 0.3 V in this example) of the normal voltage determination range, thereby controlling the power generation state of the fuel cell stack 10 during aging so that the power generation is not continued while the voltage of any of the other cells 1 exceeds the upper limit α2 (less than 0.3 V in this example) of the normal voltage determination range.

Figure 5:
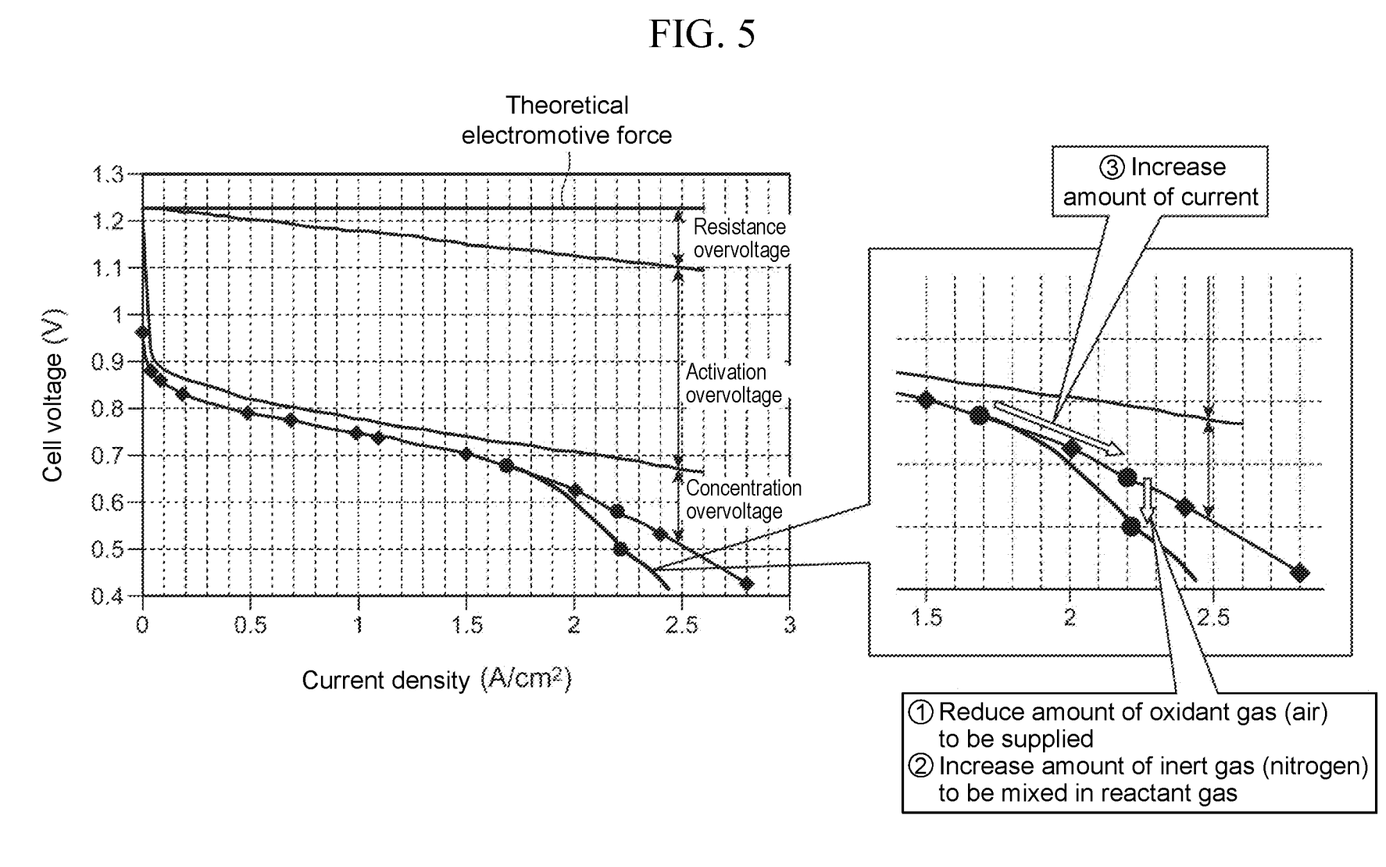
FIG. 5 is a view illustrating the effect of controlling a voltage reduction with a control unit.

Specifically, the control unit 40 compares the voltage of the end cell 1a (i.e., a voltage detected by the end cell monitor 30a) with the control switch determination threshold α3 (0.25 V in this example) and with the upper limit α2 (less than 0.3 V in this example) of the normal voltage determination range, and if the voltage of the end cell 1a exceeds the control switch determination threshold α3, reduces the amount of an oxidant gas (e.g., air) to be supplied, increases the amount of an inert gas (e.g., nitrogen) to be mixed in a reactant gas, or increases the amount of current to be supplied to the fuel cell stack 10, thereby controlling the power generation state of the fuel cell stack 10 so that the voltage of each cell 1 becomes lower as a whole (in other words, the power generation is not stopped due to the detection of a negative voltage), and continuing the power generation (i.e., aging power generation) (see FIG. 5).

In addition, the control unit 40, if the voltage of the end cell 1a exceeds the upper limit α2 of the normal voltage determination range, determines that there is a possibility that a negative voltage may be generated (in particular, a negative voltage may be generated in the plurality of central cells 1b monitored by the central cell monitor 30b) and thus stops the equipment to stop the power generation (i.e., aging power generation).

That is, in this embodiment, if the voltage of the end cell 1a exceeds the upper limit α2 (a predetermined value set to less than 0.3 V in this example) of the normal voltage determination range even in the target voltage range (0 to 0.4 V in this example) of aging, the control unit 40 stops the equipment to stop the power generation (i.e., aging power generation) so as to avoid damages to the fuel cells (or the fuel cell stack) 10 due to the generation of the negative voltage abnormality.

As described above, the aging device of this embodiment monitors alone the voltage of the end cell 1a on the reactant gas inlet 11a side, in which the voltage is likely to become highest, thereby estimating the generation of a negative voltage in the individual central cells 1b other than the end cell 1a. Therefore, the generation of a negative voltage during aging can be reliably detected while a cost reduction can also be achieved with reduced cell monitors. That is, it is possible to achieve two contradictory objectives that include performing low-potential power generation for increasing the aging speed and maintaining the function of preventing a negative voltage even when the number of channels of the cell monitors is reduced.

It should be noted that in the aforementioned embodiment, the upper limit voltage value of the fuel cell stack 10 is monitored based on the voltage of the end cell 1a on the reactant gas inlet 11a side of the gas pipe 11. However, for example, it is also possible to set the voltage of the end cell 1a at a position farthest from the reactant gas inlet 11a side of the gas pipe 11 (i.e., a voltage detected by the end cell monitor 30a) as the upper limit voltage value (i.e., another upper limit voltage value) of the fuel cell stack 10. In such a case, the control unit 40 may compare the other upper limit voltage value with the control switch determination threshold α3 (0.25 V in this example) or with the upper limit α2 (less than 0.3 V in this example) of the normal voltage determination range and control the power generation state of the fuel cell stack 10 as in the aforementioned manner.

Although the embodiments of the present disclosure have been described in detail with reference to the drawings, the specific configuration is not limited thereto, and any changes in the design and the like that are within the spirit and scope of the present disclosure are all included in the present disclosure.

DESCRIPTION OF SYMBOLS

1 Cell (fuel cell)
1a End cell
1b Central cell
2 MEGA
3 Separator
4 Membrane electrode assembly (MEA)
5 Electrolyte membrane
6 Electrode
7 Gas diffusion layer
10 Fuel cells (or fuel cell stack)
11 Gas pipe
11a Reactant gas inlet
11b Reactant gas outlet
13 Cooling water pipe
21, 22 Gas flow channel
23 Space in which water circulates
30 Cell monitor
30a End cell monitor (first cell monitor or third cell monitor)
30b Central cell monitor (second cell monitor)
40 Control unit (controller)
100 Fuel cell system

What is claimed is:

1. An aging device for a fuel cell stack having a plurality of stacked cells, comprising:
 a first cell monitor configured to monitor a voltage of only a predetermined cell on a reactant gas inlet side;
 a second cell monitor configured to collectively monitor a voltage of a plurality of cells other than the predetermined cell; and
 a controller configured to set a voltage value acquired by the first cell monitor as an upper limit voltage value, and estimate generation of a negative voltage in the plurality of individual cells monitored by the second cell monitor from the voltage values acquired by the first cell monitor and the second cell monitor.

2. The aging device for the fuel cell stack according to claim 1, wherein
 the controller is further configured to:
 set each value of an expression $\beta+\alpha_2\times(n-1)$ for determining an abnormal voltage threshold such that the abnormal voltage threshold becomes less than $\alpha_1\times n$, where $\alpha_1$ is an upper limit of a normal voltage determination range for a cell during aging, $\alpha_2$ is a lower limit of the normal voltage determination range, $\beta$ indicates an upper limit of a range of determination of a negative voltage abnormality, and n indicates the number of cells monitored by the second cell monitor, and compare the upper limit voltage value with the upper limit α1 of the normal voltage determination range, thereby controlling a power generation state of the fuel cell stack during aging.

3. The aging device for the fuel cell stack according to claim 2, wherein the controller is further configured to, when the upper limit voltage value exceeds the upper limit α1 of the normal voltage determination range, determine that there is a possibility of a negative voltage generated in the plurality of cells monitored by the second cell monitor, and thus stop aging power generation.

4. The aging device for the fuel cell stack according to claim 2, wherein the upper limit α1 of the normal voltage determination range is set to greater than or equal to a lower limit of a target voltage range of the aging, and the lower limit α2 of the normal voltage determination range is set to less than an upper limit of the target voltage range of the aging.

5. The aging device for the fuel cell stack according to claim 2, wherein the controller is further configured to:

set a control switch determination threshold that is less than the lower limit α2 of the normal voltage determination range, and when the upper limit voltage value exceeds the control switch determination threshold, increase an amount of current to be supplied to the fuel cell stack, increase an amount of an inert gas to be mixed in a reactant gas, or reduce an amount of an oxidant gas to be supplied as a reactant gas, thereby controlling a voltage of each cell such that the voltage becomes lower.

6. The aging device for the fuel cell stack according to claim 2, further comprising:

a third cell monitor configured to monitor a voltage of only a cell at a position farthest from the reactant gas inlet side, wherein the controller is further configured to set a voltage value acquired by the third cell monitor as another upper limit voltage value, and when the other upper limit voltage value exceeds the upper limit α1 of the normal voltage determination range, determine that there is a possibility of a negative voltage generated in the plurality of cells monitored by the second cell monitor, thereby stopping aging power generation.

* * * * *